US012174569B2

(12) United States Patent
Ogino

(10) Patent No.: US 12,174,569 B2

(45) Date of Patent: Dec. 24, 2024

(54) FIXING DEVICE AND IMAGE FORMING APPARATUS

(71) Applicant: Jun Ogino, Kanagawa (JP)

(72) Inventor: Jun Ogino, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/141,478

(22) Filed: May 1, 2023

(65) Prior Publication Data

US 2023/0367244 A1 Nov. 16, 2023

(30) Foreign Application Priority Data

May 10, 2022 (JP) ................................ 2022-077639

(51) Int. Cl.
*G03G 15/20* (2006.01)

(52) U.S. Cl.
CPC ................................ *G03G 15/2053* (2013.01)

(58) Field of Classification Search
CPC ....................... G03G 15/2017; G03G 15/2053
See application file for complete search history.

(56) References Cited

U.S. PATENT DOCUMENTS

| | | | | |
|---|---|---|---|---|
| 6,227,540 | B1 | 5/2001 | Nakamura et al. | |
| 2008/0199213 | A1 | 8/2008 | Saito et al. | |
| 2011/0164905 | A1 | 7/2011 | Kondo et al. | |
| 2012/0121304 | A1 | 5/2012 | Tokuda et al. | |
| 2017/0269524 | A1 | 9/2017 | Yamaji et al. | |
| 2017/0269526 | A1 | 9/2017 | Yuasa et al. | |
| 2017/0285540 | A1 | 10/2017 | Koyama | |
| 2018/0081309 | A1 | 3/2018 | Hirose et al. | |
| 2018/0284663 | A1* | 10/2018 | Matsuda | G03G 15/2042 |
| 2019/0137916 | A1* | 5/2019 | Sonoyama | G03G 15/2053 |
| 2019/0235428 | A1 | 8/2019 | Yabuki | |

FOREIGN PATENT DOCUMENTS

| | | |
|---|---|---|
| JP | 2012-103609 | 5/2012 |
| JP | 2014-052579 | 3/2014 |
| JP | 2019-132995 | 8/2019 |

OTHER PUBLICATIONS

Extended European Search Report issued Oct. 4, 2023 in European Patent Application No. 23172099.6, 9 pages.

* cited by examiner

*Primary Examiner* — Thomas S Giampaolo, II

(74) *Attorney, Agent, or Firm* — XSENSUS LLP

(57) ABSTRACT

A fixing device includes a rotatable endless belt, a pressure rotator, a heating rotator, a pad, an intermediate member, and a holder. The pad is disposed inside a loop of the endless belt and pressed by the pressure rotator to form a fixing nip portion between the endless belt and the pressure rotator. The intermediate member has a pad abutment portion to abut on the pad at a fixing nip facing portion of the pad. The holder holds the pad and the intermediate member, and has an intermediate member abutment portion to abut on a pad facing portion of the intermediate member. The pad has a recess in the fixing nip facing portion. The pad abutment portion abuts on the fixing nip facing portion and covers the recess in at least a part of the fixing nip portion corresponding to a passage region of a recording medium.

10 Claims, 13 Drawing Sheets

FIXING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-077639, filed on May 10, 2022, in the Japan Patent Office, the entire disclosure of which is hereby incorporated by reference herein.

BACKGROUND

Technical Field

Embodiments of the present disclosure relate to a fixing device and an image forming apparatus.

Related Art

There is a demand for electrophotographic image forming apparatuses to support printing of a wide variety of sheets. In order to meet this demand, there is known a slide-fixing technique by which a fixing nip portion of a fixing device is formed by a pressure roller and an elongated plate pad (sliding pad) having a planar shape.

In such a slide-fixing technique, a fixing nip portion is formed by pressing a pressure roller including a rubber elastic layer and a pad arranged to face each other with a sheet conveyance path in between.

In order to receive the pressure of the pressure roller, a holder for holding the pad is generally provided. The holder is made of metal so as to withstand pressure. Therefore, in consideration of improving the heat accumulation property, it is desirable to retain the heat received from the heating roller via the fixing belt as much as possible, and thus the pad is generally formed of plastic having low thermal conductivity.

On the other hand, in the case of forming the pad from a plastic, in order to make the pad itself resistant to the pressure of the pressure roller, the pad is provided with ribs (lattice) to enhance rigidity. According to this configuration, the portion of the pad on the holder side has a plurality of recesses. Then, the recesses come into contact with the holder.

However, for example, in the case of a configuration in which a projecting portion of a pad is in close contact with a sandwiching member which is a holder with high thermal conductivity, heat easily escapes to the holder side.

Therefore, according to this method, the amount of heat that can be retained by the pad is reduced. With a reduction in the amount of heat, for example, if thick sheets of paper or the like are continuously passed, the fixing nip portion cannot supply a sufficient amount of heat for fixing a toner image on the sheets, and as a result, an image failure such as a fixing failure occurs. Therefore, in order to prevent this, it is necessary to provide a member for preventing a reduction in the amount of heat between the pad and the holder.

For example, a fixing device includes a fixing belt, a fixing pad arranged to face a pressure roller with the fixing belt in between and form a fixing nip between the fixing belt and the pressure roller, and a heating roller supporting the fixing pad, in which the fixing pad is movable in directions of contact into and separating from the pressure roller and is sandwiched between and supported by the pressure roller and the heating roller, and a resin lower in hardness than the heating roller is provided at portions of the fixing pad that come into contact with the heating roller.

However, in the above-described configuration, the resin is provided at both ends of the fixing pad as viewed in the sheet width direction, and no consideration is given to the region of the fixing pad through which the sheet passes. Therefore, it cannot be said that this configuration is sufficient to prevent a reduction in the amount of heat of the fixing pad.

SUMMARY

According to an embodiment of the present disclosure, a fixing device includes a rotatable endless belt, a pressure rotator, a heating rotator, a pad, an intermediate member, and a holder. The pressure rotator faces the endless belt to press the endless belt. The heating rotator heats the endless belt. The pad is disposed inside a loop of the endless belt and pressed by the pressure rotator via the endless belt to form a fixing nip portion between the endless belt and the pressure rotator. The intermediate member has a pad abutment portion to abut on the pad at a fixing nip facing portion that is a portion of the pad facing the fixing nip portion. The holder holds the pad and the intermediate member. The holder has an intermediate member abutment portion to abut on a pad facing portion that is a portion of the intermediate member facing the pad abutment portion. The pad has a recess in the fixing nip facing portion. The pad abutment portion abuts on the fixing nip facing portion and covers the recess in at least a part of the fixing nip portion corresponding to a passage region of a recording medium.

According to another embodiment of the present disclosure, an image forming apparatus includes the fixing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
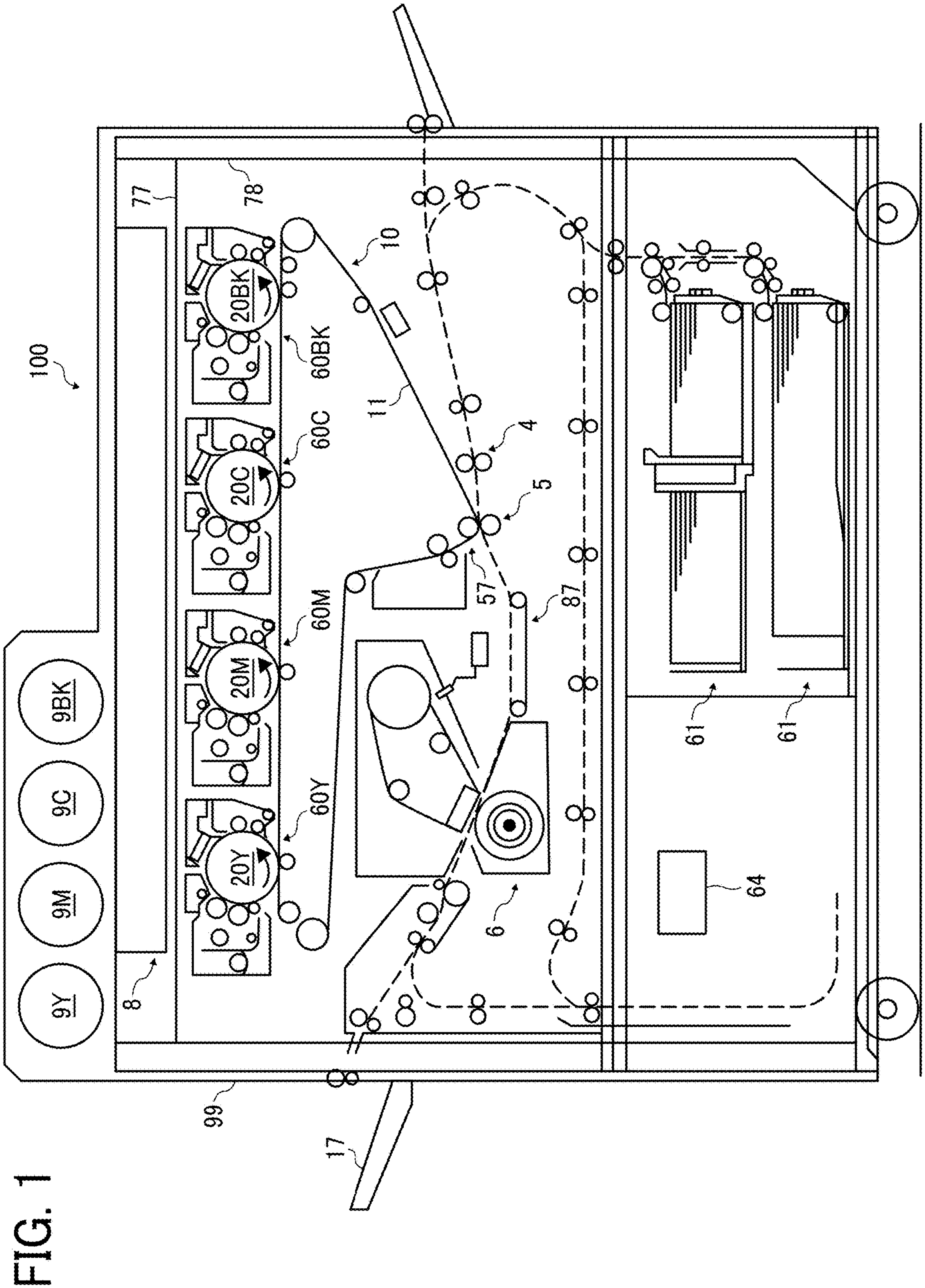
FIG. 1 is an explanatory diagram of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An embodiment of the present disclosure will be described below with reference to the drawings.

Image Forming Apparatus According to Embodiment

First, an image forming apparatus according to an embodiment of the present disclosure will be described.

FIG. 1 is a diagram schematically illustrating an image forming apparatus according to an embodiment of the disclosure. Referring to FIG. 1, an image forming apparatus 100 is a color laser printer. The image forming apparatus 100 may be another image forming apparatus such as another type of printer, a facsimile, a copier, or a multifunction peripheral of a copier and a printer. The image forming apparatus 100 performs an image forming process on the basis of an image signal corresponding to image information received from the outside. The image forming apparatus 100 can form an image using any of plain paper generally used for copying and the like, an overhead projector (OHP) sheet, a card, thick paper such as a postcard or an envelope, and the like as a sheet-like recording medium.

In the image forming apparatus 100, photoconductor drums 20Y, 20M, 20C, and 20BK as first image bearers capable of forming images corresponding to separate colors, yellow (Y), magenta (M), cyan (C), and black (BK), are arranged in parallel. The parallel arrangement is referred to as tandem structure, in other words, "tandem system". The image forming apparatus 100 adopts the "tandem system".

The image forming apparatus 100 includes four image forming units 60Y, 60M, 60C, and 60BK in a main body 99. The image forming apparatus 100 also includes a transfer belt unit 10 as an intermediate transfer unit, which is an intermediate transfer device including a transfer belt 11 that is arranged below and faces the photoconductor drums 20Y, 20M, 20C, and 20BK. The image forming apparatus 100 further includes a secondary transfer device 5 arranged below the transfer belt 11 in FIG. 1 so as to face the transfer belt 11, and an optical scanning device 8 corresponding to an exposing unit used in an optical writing device as an electrostatic latent image forming unit. Among these devices, the optical scanning device 8 is arranged above and facing the image forming units 60Y, 60M, 60C, and 60BK. The image forming apparatus 100 also includes a sheet feeding device 61 as a sheet feeding cassette in which a large number of sheets (transfer sheets) S can be stacked.

The main body 99 contains the transfer belt 11 and the secondary transfer device 5. In the image forming apparatus 100, the sheet S is fed from the sheet feeding device 61 toward the secondary transfer part 57 between the transfer belt 11 and the secondary transfer device 5.

The main body 99 also contains a registration roller pair 4 that feeds the sheet S having been conveyed from the sheet feeding device 61 toward the secondary transfer part 57 at a predetermined timing corresponding to the timing for toner image forming by the image forming units 60Y, 60M, 60C, and 60BK. The main body 99 further contains a sensor that detects that the leading end of the sheet S has reached the registration roller pair 4.

The image forming apparatus 100 also includes, in the main body 99, a fixing device 6 as a fixing unit of a belt fixing system for fixing the toner image on the sheet S to which the toner image has been transferred, and a belt conveyance device 87 that conveys the sheet S having passed through the secondary transfer part 57 to the fixing device 6.

The image forming apparatus 100 further includes a sheet ejection roller 7 as a sheet ejection roller pair of ejection rollers that eject the fixed sheet S to the outside of the main body 99, and a sheet ejection tray 17 as a sheet ejection part in which the sheets S ejected to the outside of the main body 99 by the sheet ejection rollers 7 are stacked.

The image forming apparatus 100 includes toner bottles 9Y, 9M, 9C, and 9BK that are arranged on the upper part of the main body 99 and are filled with image forming toner of yellow (Y), magenta (M), cyan (C), and black (BK), that is, toner. The image forming apparatus 100 includes an optical scanning device support frame 77 to which the optical scanning device 8 is fastened and fixed, and a plate-like side plate 78 to which the frame is positioned and fixed. The image forming apparatus 100 corresponds to each of the photoconductor drums 20Y, 20M, 20C, and 20BK, and includes a driving device that rotationally drives each of the photoconductor drums 20Y, 20M, 20C, and 20BK, and a controller 64 including a central processing unit (CPU), a memory, and the like that controls the overall operations of the image forming apparatus 100.

Next, features of some embodiments of the present disclosure will be described.

Fixing Device in Embodiment

First, an outline of the fixing device according to an embodiment of the present disclosure will be described.

Figure 2:
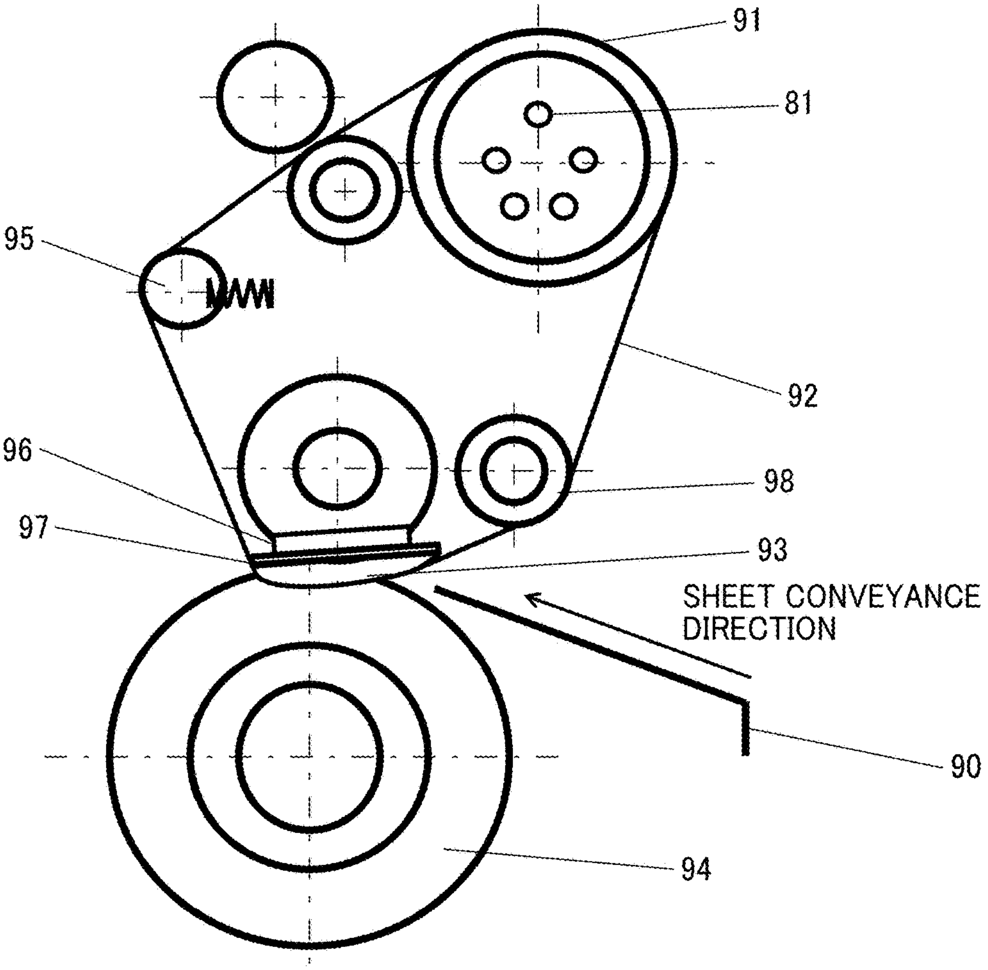
FIG. 2 is an explanatory diagram of a fixing device according to an embodiment of the present disclosure.

FIG. 2 illustrates the fixing device according to the present embodiment. The fixing device 6 includes an inlet guide 90, a heating roller 91, an endless fixing belt 92 wound around the heating roller 91, an elongated sliding pad 93 wound around the fixing belt 92 together with the heating roller 91, an auxiliary roller 95 that applies tension (tensile force) to the fixing belt 92, and an inlet roller 98. The fixing belt 92 is an example of a rotatable endless belt, and the heating roller 91 is an example of a heating rotator that heats the endless belt. The sliding pad 93 is an example of a pad.

The fixing device 6 includes a pressure roller 94, which is a pressure rotator as a pressure member, provided at a position facing the sliding pad 93 with the fixing belt 92 in between. The pressure roller 94 presses the sliding pad 93 via the fixing belt 92 to form a fixing nip portion. In the present embodiment, the nip width of the fixing nip portion is set to 30 mm. The sheet is guided by the inlet guide 90 to enter the fixing nip portion.

Heating Roller in Embodiment

Next, the heating roller 91 in the fixing device 6 will be described. The heating roller 91 contains heater lamps 81 that are heating units as heat sources. Typical examples of the heater lamps 81 include halogen heaters and carbon heaters. In the present embodiment, five heater lamps 81 are used, but embodiments of the present disclosure are not limited thereto.

The heating roller 91 heated by the heater lamps 81 heats the fixing belt 92. In the present embodiment, the heating roller 91 is heated by the internal heater lamps 81. However, for example, the heating roller 91 may be configured as a rotator made of a magnetic shunt alloy, and may be of an "IH heater system" that is heated by an external induction heating unit.

Fixing Belt in Embodiment

Next, a configuration of the fixing belt 92 will be described. The fixing belt 92 has a three-layer structure of a surface layer 921 (layer in abutment with the pressure roller 94), an intermediate layer 922, and a lowermost layer 923. PFA is used as the material of the surface layer 921, and the thickness of the layer is 150 μm. Silicone is used as the material of the intermediate layer 922, and the thickness of the layer is 350 μm. Polyimide is used as the material of the lowermost layer, and the thickness of the layer is 110 μm.

In the present embodiment, a lubricant is applied between the fixing belt 92 and the sliding pad 93 in order to enhance lubricity. Silicone oil is used as the lubricant. The lubricant is applied by an application roller.

Pressure Roller in Embodiment

Next, a configuration of the pressure roller 94 will be described. As described above, the pressure roller 94 is a pressure member that is provided at a position facing the sliding pad 93 with the fixing belt 92 in between, and forms the fixing nip portion by being pressed against the sliding pad 93 with the fixing belt 92 in between. In the present embodiment, a load of 3000 N is applied to the sliding pad 93.

The diameter φ of the pressure roller 94 in the present embodiment is 80 mm. The pressure roller 94 covers the core bar with a rubber layer. In the rubber layer, silicone rubber is used as the material of the rubber, and the thickness of the rubber layer is 15 mm.

Holder in Embodiment

Figure 3:
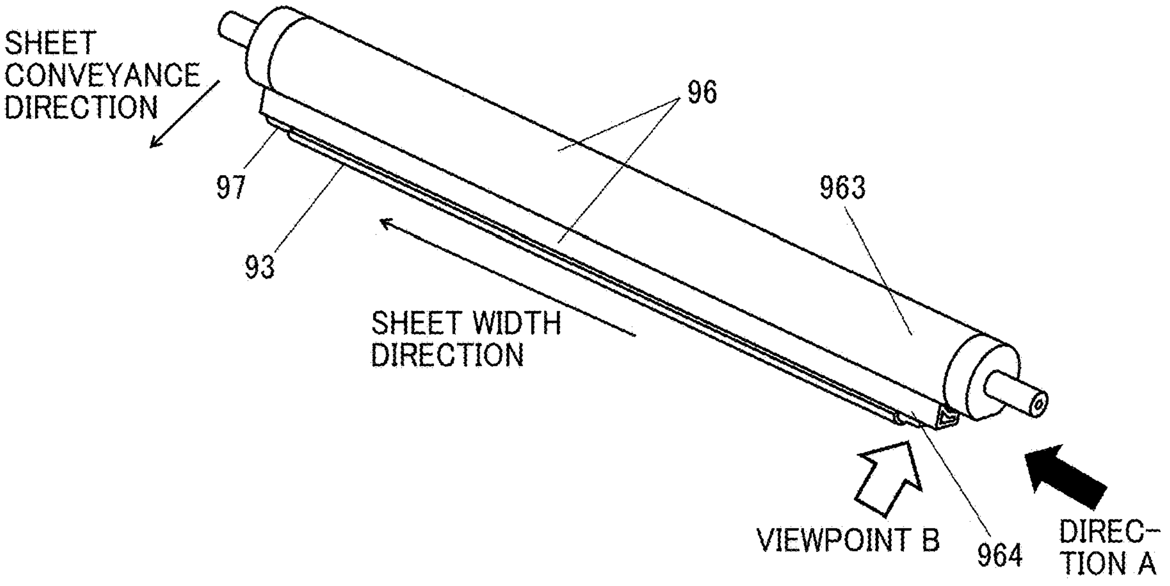
FIG. 3 is a perspective view of a holder to which a sliding pad and an intermediate member are attached according to an embodiment of the present disclosure.

Next, a configuration of the holder 96 according to an embodiment of the present disclosure will be described with reference to FIGS. 3, 4A, and 4B. FIG. 3 is a perspective view of the holder 96 to which the sliding pad 93 and the intermediate member 97 are attached.

As illustrated in FIG. 3, the holder 96 includes a load receiving portion 963 and an attachment portion 964. First, the load receiving portion 963 plays the role of receiving the load on the sliding pad 93 under a pressure from the pressure roller 94. In order to provide rigidity for withstanding the load, the load receiving portion 963 is mainly formed of a steel material such as iron.

On the other hand, the attachment portion 964 plays the role of positioning sliding pad 93 in addition to the role of receiving the pressure. In the present embodiment, the attachment portion 964 is mainly formed of aluminum in consideration of processability.

Figure 4A:
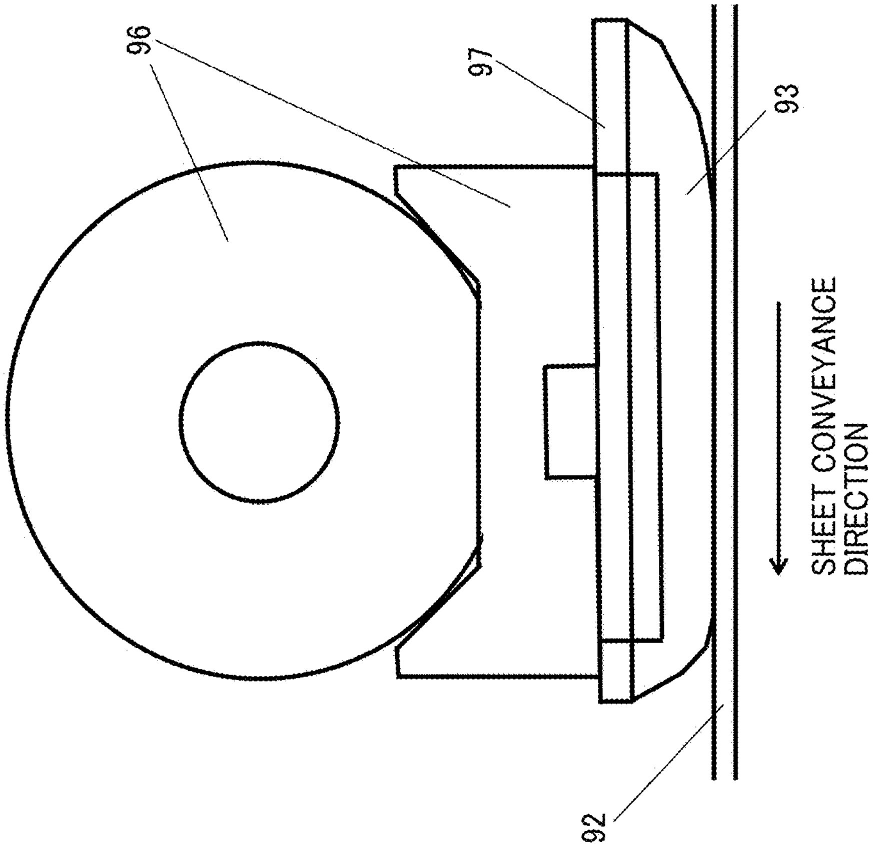
FIGS. 4A and 4B are explanatory views of the holder according to an embodiment of the present disclosure.
Figure 4B:
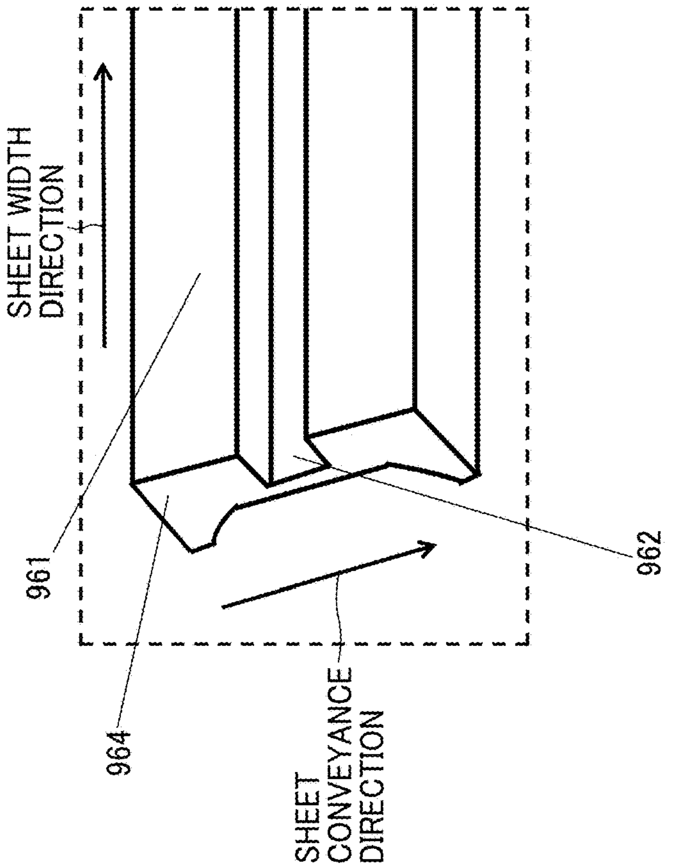
Figure 5:
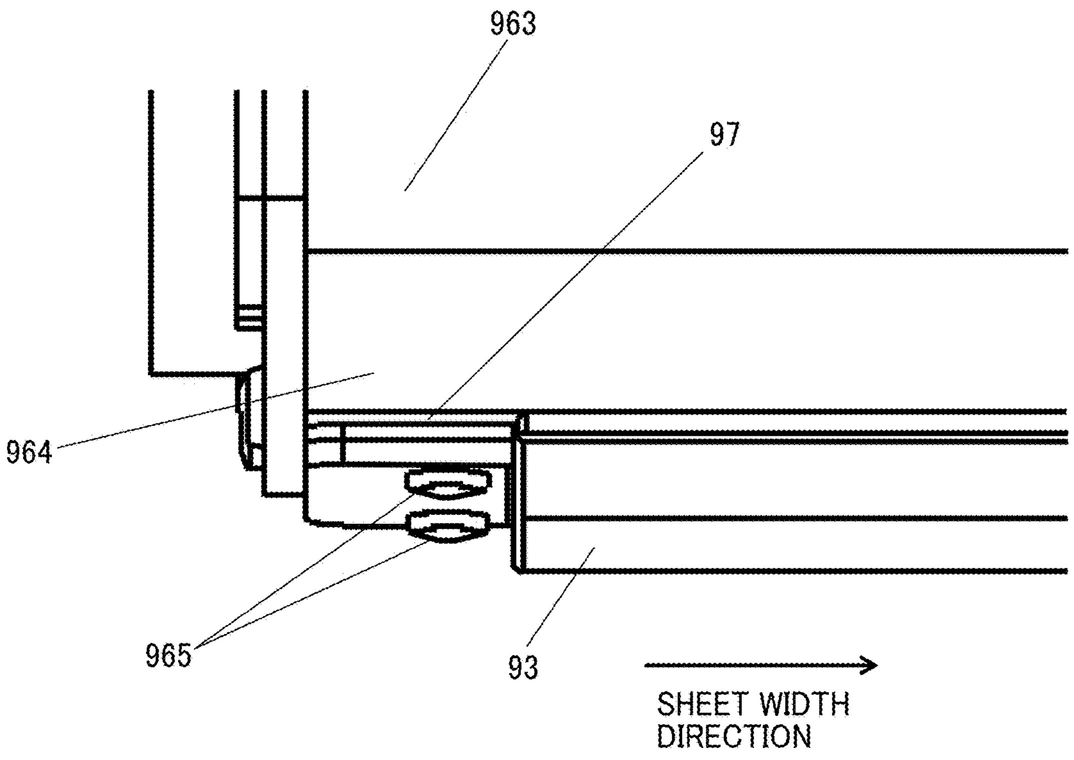
FIG. 5 is a diagram illustrating an end of the holder in a sheet width direction with the sliding pad and the intermediate member attached to the holder according to an embodiment of the present disclosure.

FIGS. 4A and 4B are diagrams for explaining the holder 96 in the present embodiment. FIG. 4A is a view of the holder 96 from the direction A in FIG. 3 (a view of the holder 96 as viewed from the sheet width direction), and FIG. 4B is a perspective view of the holder 96 from the viewpoint B in FIG. 3 (a view of the holder 96 from the pressure roller 94 side). FIG. 5 is a diagram illustrating the holder 96 to which the sliding pad 93 and the intermediate member 97 are attached in the present embodiment. How to attach the sliding pad 93 and the intermediate member 97 to the holder 96 and how to perform positioning will be described with reference to these drawings.

First, as illustrated in FIG. 4A, three members of the holder 96, the sliding pad 93, and the intermediate member 97 are arranged in the order of the sliding pad 93, the intermediate member 97, and the holder 96 from the fixing belt 92 side. In addition to the function of receiving a load, the holder 96 has a function of fixing and holding the sliding pad 93 and the intermediate member 97.

As illustrated in FIG. 4B, the attachment portion 964 of the holder 96 has an intermediate member abutment portion 961 which is a portion in abutment with the intermediate member 97. FIG. 4B illustrates a portion of the intermediate member abutment portion 961 around the end in the sheet width direction. In the present embodiment, the intermediate member abutment portion 961 is formed in a flat shape. The intermediate member abutment portion 961 is provided with a positioning recess 962 around a central portion in the sheet conveyance direction. As will be described later, the sliding pad 93 is provided with a positioning protrusion (positioning portion 935), and the positioning portion 935 is fitted into the positioning recess 962. As a result, the sliding pad 93 is positioned with respect to the holder 96.

As will be described in detail later, the intermediate member 97 is provided with a hole 974 that engages with the positioning portion 935. When the positioning portion 935 of the sliding pad 93 is engaged with the hole 974, the intermediate member 97 is positioned with respect to the holder 96.

FIG. 5 is a diagram illustrating an end of the holder 96 in the sheet width direction in a state where the sliding pad 93 and the intermediate member 97 are attached to the holder 96. The ends of the sliding pad 93 and the intermediate member 97 in the sheet width direction are provided with screw holes for attachment to the holder 96. The sliding pad 93 and the intermediate member 97 are fixed to and held by the holder 96 by screws 965 being fitted and fastened to the holes.

Sliding Pad in Embodiment

Next, the sliding pad 93 will be described. The sliding pad 93 serves as a nip forming member because it abuts on the pressure roller 94 with the fixing belt 92 in between to form a fixing nip portion. As described above, the sliding pad 93 is fixed to the holder 96. The sliding pad 93 is formed of a material with a low thermal conductivity such as plastic in order to enhance the heat accumulation property.

Figure 6:
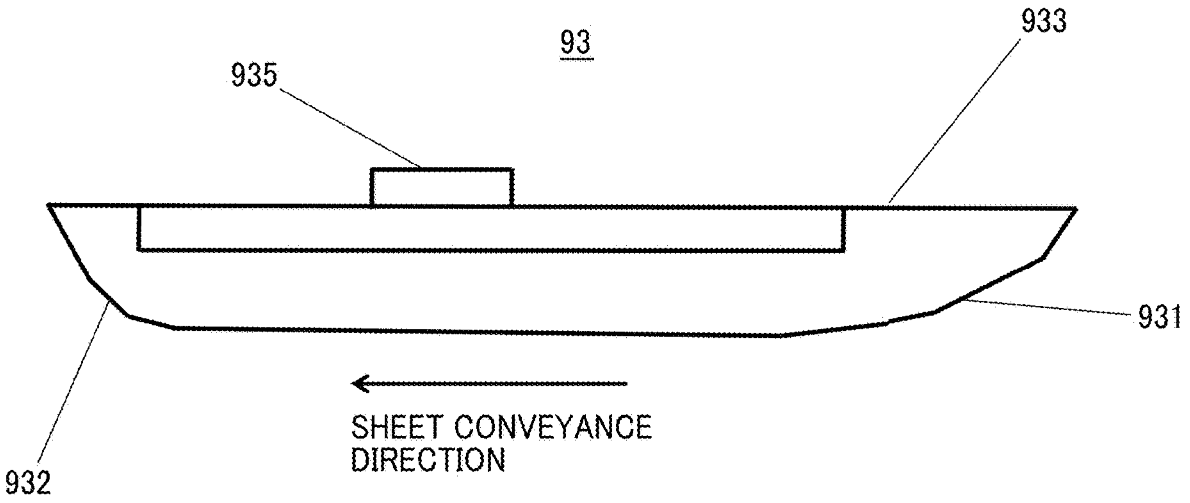
FIG. 6 is an explanatory view of the sliding pad according to an embodiment of the present disclosure.

FIG. 6 is a view of the sliding pad 93 from the sheet width direction (a view of the sliding pad 93 from the A direction in FIG. 3). The sliding pad 93 is provided with curved portions 931 and 932 on the upstream side and the downstream side in the sheet conveyance direction. The downstream curved portion 932 is made larger in curvature than the upstream curved portion 931 so as to apply pressure to the sheet having passed through the fixing nip portion and separate the sheet from the fixing belt 92.

The sliding pad 93 has a fixing nip facing portion 933 which is a portion facing the fixing nip portion, and this portion abuts on a sliding pad abutment portion 971 of the intermediate member 97 described later. Here, the above-described "portion facing the fixing nip portion" refers to a "portion on a side opposite to the fixing nip portion". The fixing nip facing portion 933 is provided with a positioning portion 935. The positioning portion 935 is engaged with the positioning recess 962 of the holder 96 described above to determine the position of the sliding pad 93 with respect to the holder 96.

The fixing nip facing portion 933 is provided with ribs (grid) 939, thereby forming a plurality of recesses, large pad recesses 936, small pad recesses 937, and upstream pad recesses 938. This configuration will be described in detail below. In the present specification, for convenience, large pad recesses 936, small pad recesses 937, and upstream pad recesses 938 may be collectively referred to simply as pad recesses.

Figure 7A:
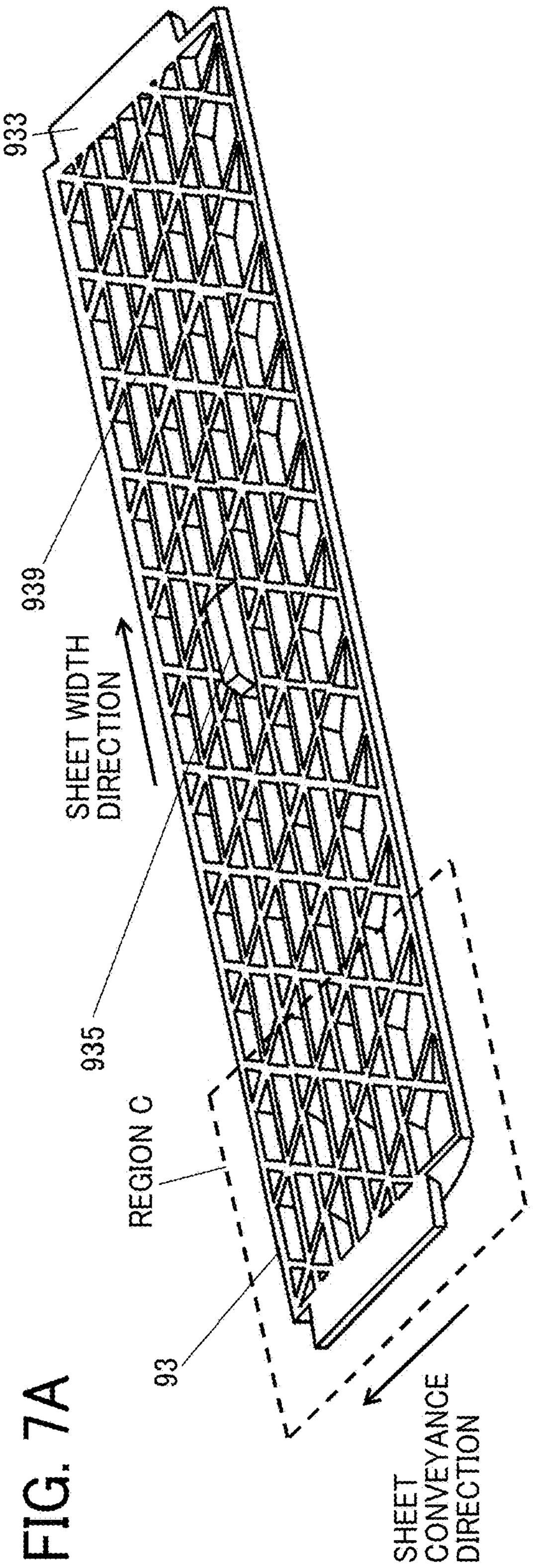
FIGS. 7A, 7B, and 7C are diagrams for explaining a sheet width direction of a plurality of pad recesses in the sliding pad according to the embodiment of the present disclosure.
Figure 7B:
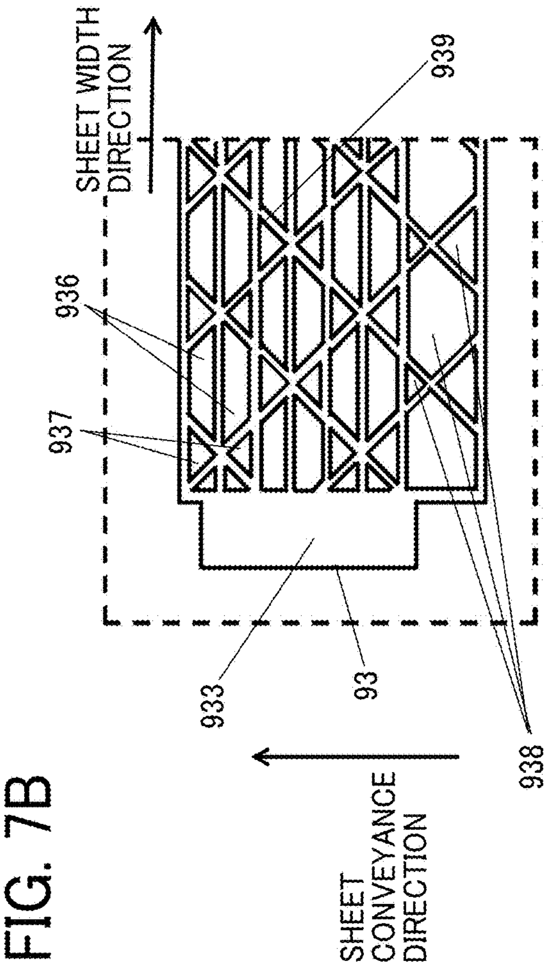
Figure 7C:
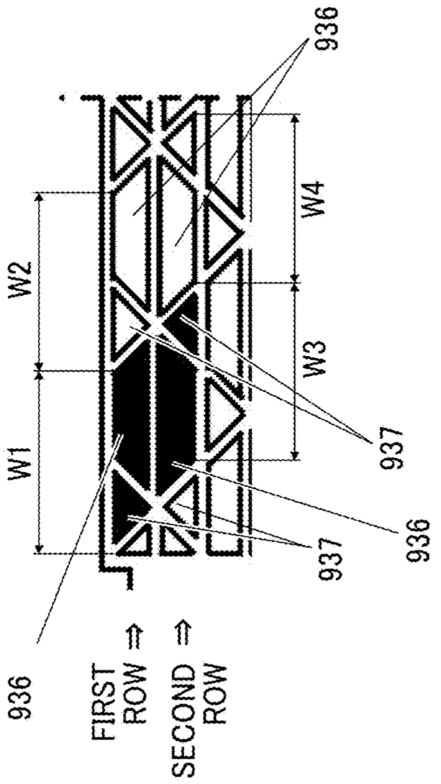

FIGS. 7A to 7C are diagrams for explaining a sheet width direction of the plurality of pad recesses in the sliding pad in the present embodiment. FIG. 7A is a perspective view of the sliding pad 93. FIG. 7B is a view of the fixing nip facing portion 933 in a region C (a region indicated by a broken line) of the sliding pad 93 in FIG. 7A from the holder 96 side. FIG. 7C is an enlarged view of a part of FIG. 7B in order to describe the width of the pad recesses in the sheet width direction. First, the sheet width direction of the pad recesses will be described with reference to FIG. 7B.

Referring to FIG. 7B, although the large pad recesses 936 and the small pad recesses 937 having different sizes are provided, it can be seen that they are regularly arranged in the sheet width direction. It can also be seen that the upstream pad recesses 938, which are pad recesses on the upstream side of the sliding pad 93 in the sheet conveyance direction, are regularly arranged in the sheet width direction. Here, a more detailed description will be given with reference to FIG. 7C. For example, in the first row, one large pad recess 936 and one small pad recess 937 are set as one set of pad recesses (black portions), and the width of the pad recess set in the sheet width direction is set as a width W1. The width W1 and a width W2, which is the width of another pad recess set, are substantially the same. Also in the second row, one large pad recess 936 and one small pad recess 937 are set as one set of pad recesses (black portions), and the width of the pad recess set in the sheet width direction is width W3. Then, the width W3 and a width W4, which is the width of another pad recess set, are substantially the same. Namely, it can be said that the widths of the pad recesses in the sheet width direction are substantially the same (substantially equal). That is, the widths of the pad recesses in the sheet width direction in the present embodiment are substantially the same. With such a configuration, the sliding pad 93 can uniformly disperse the received pressure from the pressure roller 94.

Pad recess depths 940, which are the depths of the pad recesses (length from the facing portion to the bottom portion of the sliding pad 93 in a direction orthogonal to the fixing nip facing portion 933), are determined from the following viewpoints. First, in the thickness direction of the sliding pad 93 (the direction orthogonal to the fixing nip facing portion 933), there is less influence of the pressure from the pressure roller 94 than in the sheet width direction of the sliding pad 93. On the other hand, it is necessary to include a space for accumulating sufficient heat in the pad recesses. It is also necessary to consider the moldability of the sliding pad 93 and to retain the thickness (wall thickness) of the sliding pad 93 so as to withstand the pressure. Based on these considerations, the depths of the pad recesses are determined.

Figure 8:
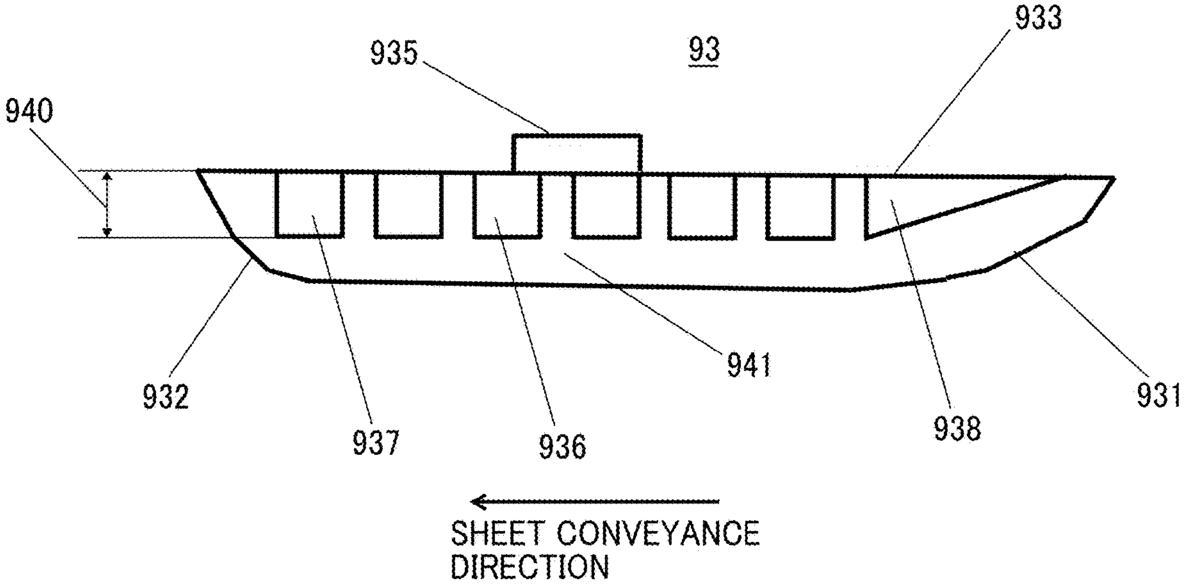
FIG. 8 is a diagram for explaining a depth of the plurality of pad recesses in the sliding pad according to the embodiment of the present disclosure.

FIG. 8 is a diagram for explaining the depths of a plurality of pad recesses of the sliding pad. In the present embodiment, the depth of each pad recess varies depending on the position. The depths 940 of the plurality of pad recess provided at positions corresponding to the fixing nip portion have the same depth.

In the present embodiment, the ribs 939 constituting the plurality of other pad recesses are provided laterally (along the sheet width direction) or obliquely, but embodiments of the present disclosure are not limited to this configuration. For example, the plurality of oblique pad recesses may be made vertical (along the sheet conveyance direction), so that quadrangular pad recesses are arranged on the fixing nip facing portion 933. In the present embodiment, the widths W1 and W3 are substantially equal to each other, and the widths W2 and W4 are substantially equal to each other from the viewpoint of facilitating the manufacture of the sliding pad 93.

Here, the reason why a plurality of pad recesses is provided in the fixing nip facing portion 933 will be described.

First, it is conceivable to use a roller member instead of a pad as the nip formation member. However, in the case of using a roller member, the pressure roller is also a roller member and the fixing nip portion has an arc shape. Accordingly, the sheet passing through the fixing nip portion may be wrinkled, curled, or the like. Therefore, in order to prevent this, it is desirable to use a pad that forms a stable fixing nip portion as the nip formation pad. In the present embodiment, a pad is adopted.

Further, in the present embodiment, the sliding pad 93 is formed of a material with a low thermal conductivity such as plastic. This is because the sliding pad 93 needs to be enhanced in the heat accumulation property from the viewpoint of heating the passing sheet. At this time, if the sliding pad 93 is made of a metal material, since metal generally has a high thermal conductivity, heat escapes to the holder 96 due to contact with the holder 96. Thus, in the present embodiment, the sliding pad 93 is formed of plastic or the like which is generally a material with a low thermal conductivity.

On the other hand, if the sliding pad 93 is formed of plastic or the like, the sliding pad 93 may be low in dimension accuracy or may become warped as compared with the case where the sliding pad is formed of metal. In order to solve this problem, it is necessary to make the sliding pad 93 uniform in thickness (wall thickness). In this case, however, the sliding pad 93 may not withstand the pressure from the pressure roller. Therefore, in order to increase durability, the sliding pad 93 is provided with ribs or the like to enhance rigidity and improve durability. As a result, in the present embodiment, a plurality of pad recesses is provided in the fixing nip facing portion 933 which is a portion of the sliding pad 93 on the side attached to the holder 96.

Figure 9:
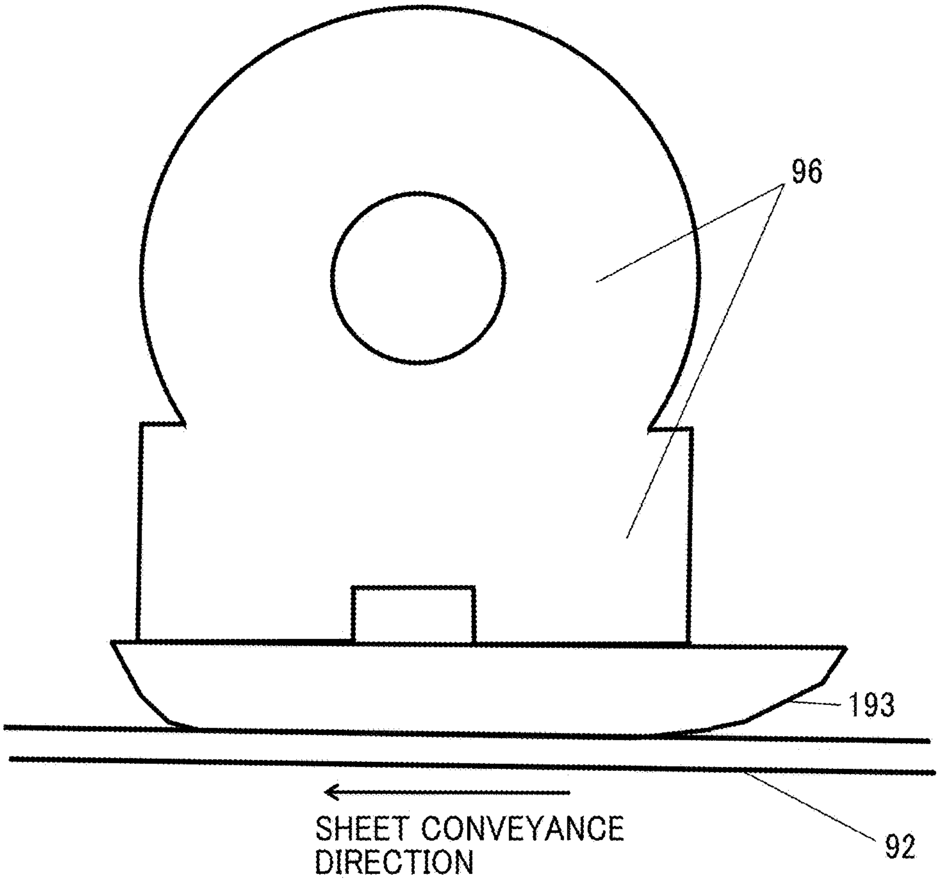
FIG. 9 is a cross-sectional view of a sliding pad provided with no plurality of recesses at a fixing nip facing portion and a holder, two of which are in contact with each other on the entire surface.

If the sliding pad 93 is configured as described above, the following problem occurs. The heat supplied from the heating roller 91 via the fixing belt 92 is transferred to the holder 96 via the sliding pad 93. However, the heat from the surfaces of the pad recesses of the sliding pad 93 is also transferred (radiated) to the holder 96 via the space (air). The amount of heat transferred is larger than that in the configuration in which the sliding pad 93 and the holder 96 are brought into contact with each other on the entire surface as illustrated in FIG. 9 in which the plurality of pad recesses is not provided in the fixing nip facing portion, from the relationship between the area of contact (contact area) between a sliding pad 193 and the holder 96 and their respective thermal conductivities. Therefore, the heat accumulation property of the sliding pad 93 decreases.

Figure 10:
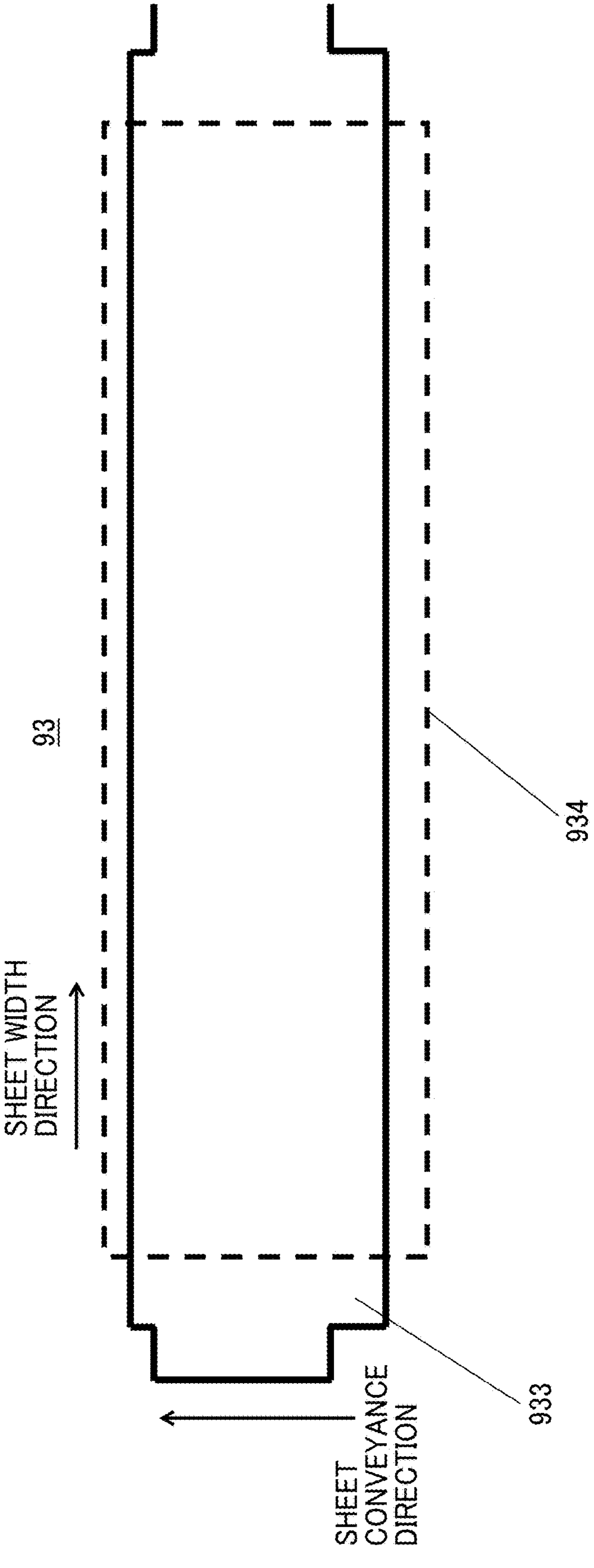
FIG. 10 is a diagram for explaining a region in the fixing nip portion corresponding to a region through which a sheet passes at the fixing nip facing portion of the sliding pad.

As illustrated in FIG. 10, in particular, in a region 934 corresponding to a region through which the sheet passes in the fixing nip portion at the fixing nip facing portion of the sliding pad 93, the sheet takes the heat during passage, and thus it is necessary to retain a sufficient amount of heat. If the heat accumulation property of the sliding pad 93 is reduced, a sufficient amount of heat cannot be provided to the sheet, and a fixing failure or the like may occur. FIG. 10 is a plan view of the fixing nip facing portion 933 from the holder 96 side.

Therefore, in order to prevent this problem, according to an embodiment of the present disclosure, there is provided an intermediate member 97 described below.

Intermediate Member in Embodiment

Figure 11:
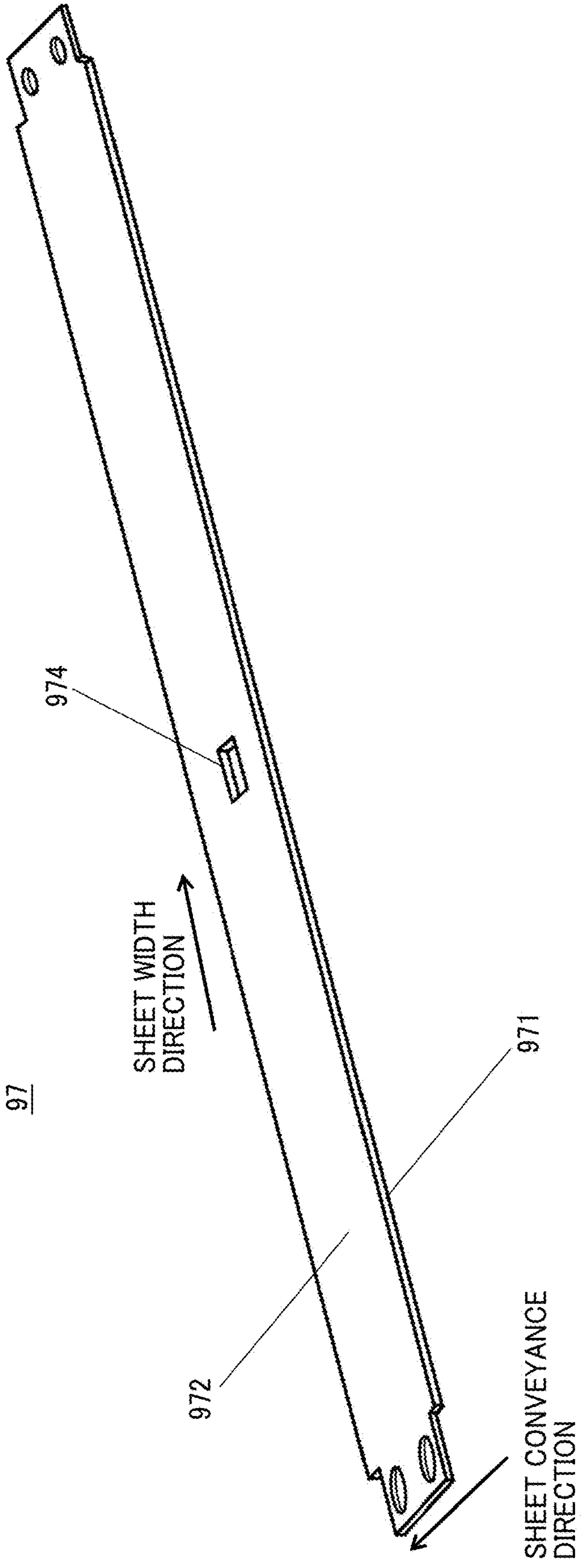
FIG. 11 is a perspective view of an intermediate member according to the embodiment of the present disclosure.

Here, the intermediate member 97 will be described. FIG. 11 is a perspective view of the intermediate member 97. The intermediate member 97 includes a sliding pad abutment portion 971 (an example of a pad abutment portion) that comes into abutment with the fixing nip facing portion 933 of the sliding pad 93, and a sliding pad facing portion 972 that faces the sliding pad abutment portion 971 (positioned on the side opposite to the sliding pad abutment portion 971) and comes into abutment with the intermediate member abutment portion 961 of the holder 96. The sliding pad facing portion 972 is formed in a single planar shape from the viewpoint of stable holding of the holder 96 and the viewpoint of processability.

In the present embodiment, the sliding pad abutment portion 971 is formed in a single planar shape in consideration of good processability and the fact that the sliding pad abutment portion can be in abutment with the sliding pad 93, desirably in close contact with the sliding pad 93. As a result, the sliding pad abutment portion 971 comes into abutment with or comes into close contact with the plurality of pad recesses in the fixing nip facing portion 933 of the sliding pad 93, whereby the heat accumulated in the pad recesses is less likely to escape to the holder 96 side, and the heat accumulation property of the sliding pad 93 is improved.

In particular, as illustrated in FIG. 10, it is necessary to retain a sufficient amount of heat at least in the region 934 (region surrounded by a broken line in FIG. 10) corresponding to the region through which the sheet passes in the fixing nip portion in the fixing nip facing portion 933 of the sliding pad 93. As described above, this is because the heat is taken by the sheet passing through the region 934. Therefore, it is to be noted that this region 934 is configured such that the intermediate member 97 and the sliding pad 93 can sufficiently abut on each other as compared with in other regions.

Further, in the present embodiment, the sliding pad abutment portion 971 has a single planar shape, but is not limited to this shape as long as the intermediate member 97 and the sliding pad 93 can sufficiently abut on each other so that heat can be accumulated in the pad recesses of the sliding pad 93.

The intermediate member 97 is formed of a material with a low thermal conductivity such as a heat resistant polymer (liquid crystal polymer (LCP)). The thermal conductivity of the intermediate member 97 is smaller than that of the holder 96. Furthermore, the thermal conductivity of the intermediate member 97 is smaller than that of the sliding pad 93.

In the present embodiment, the thickness of the intermediate member 97 is 1.5 mm. However, embodiments of the present disclosure are not limited thereto.

Figure 12:
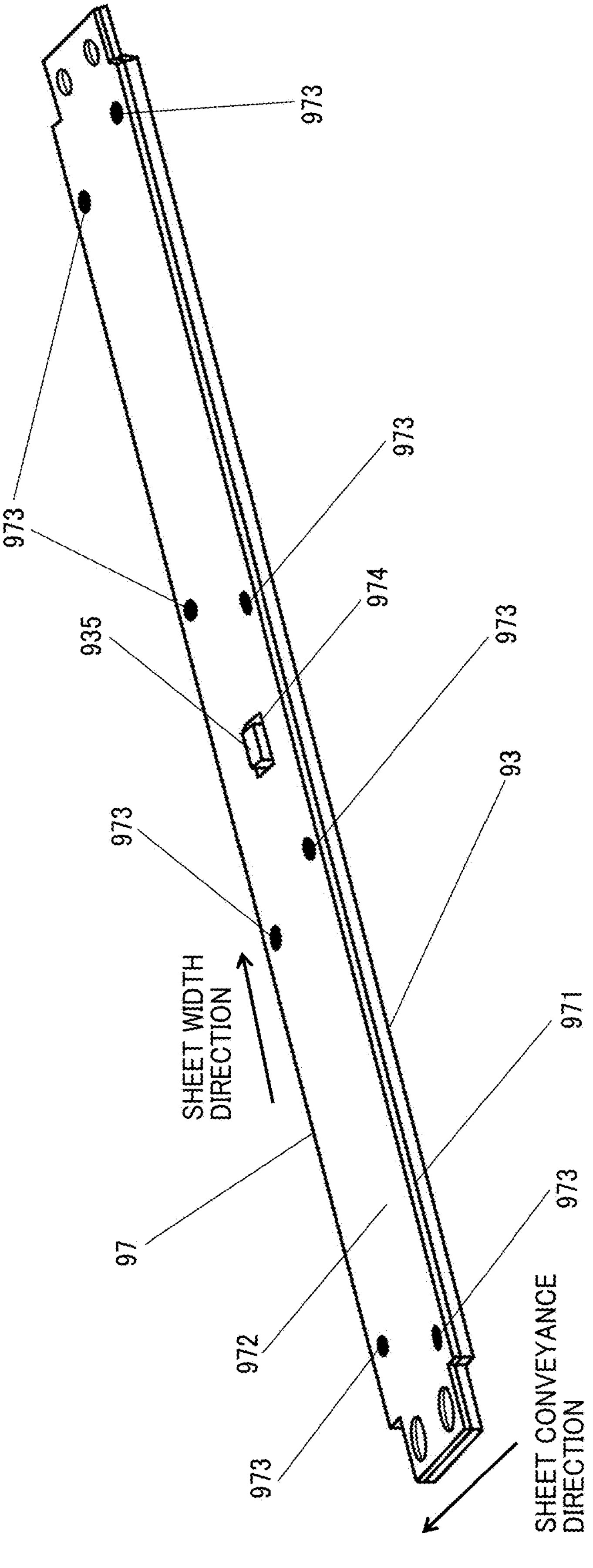
FIG. 12 is a perspective view of the intermediate member attached to the sliding pad according to the embodiment of the present disclosure.

A method of attaching the intermediate member 97 to the sliding pad 93 and a method of determining the attachment position will be described with reference to FIG. 12. The intermediate member 97 is provided with the hole 974. As having been described above, the positioning portion 935 of the sliding pad 93 is fitted into the hole 974 as illustrated in FIG. 12. The intermediate member 97 is positioned with respect to the sliding pad 93 by engagement between the hole 974 and the positioning recess 962 in the holder 96. This positioning allows the intermediate member 97 to be positioned with respect to the holder 96. As a result, the holder 96 can stably hold the sliding pad 93 and the intermediate member 97.

The intermediate member 97 is fixed to the sliding pad 93 by performing thermal caulking 973. Since the heat accumulation property is improved by increasing the adhesion, the thermal caulking 973 is mainly performed across the region 934. The fixing method is not limited to thermal caulking, and another method may be employed.

Figure 13A:
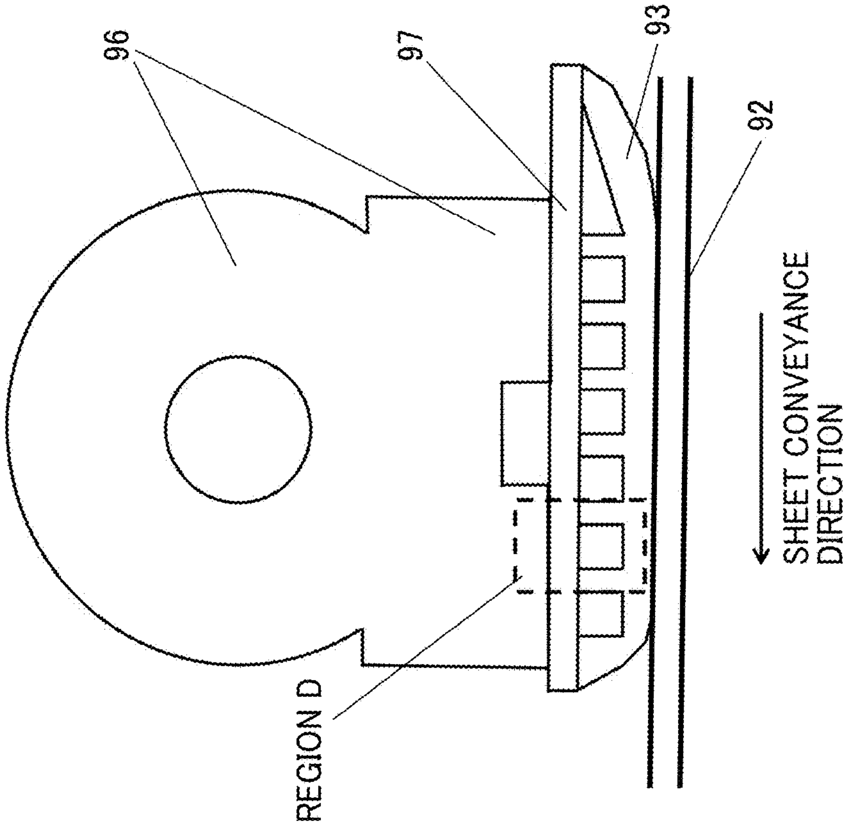
FIGS. 13A and 13B are diagrams illustrating heat transfer in the sliding pad according to the embodiment of the present disclosure.
Figure 13B:
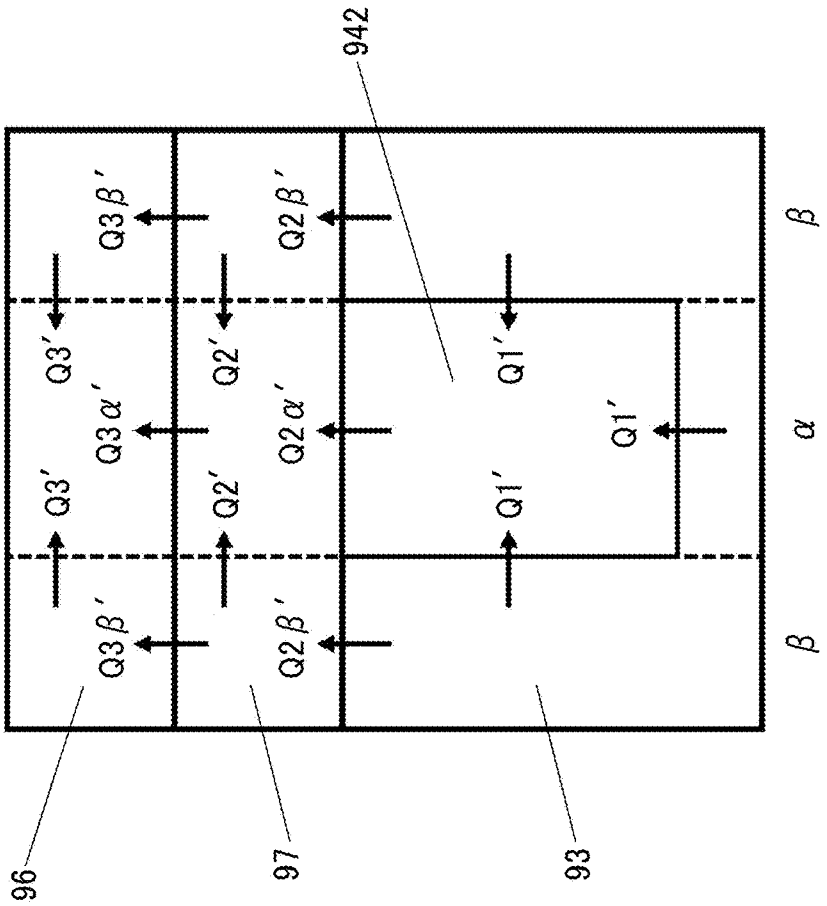
Figure 14B:
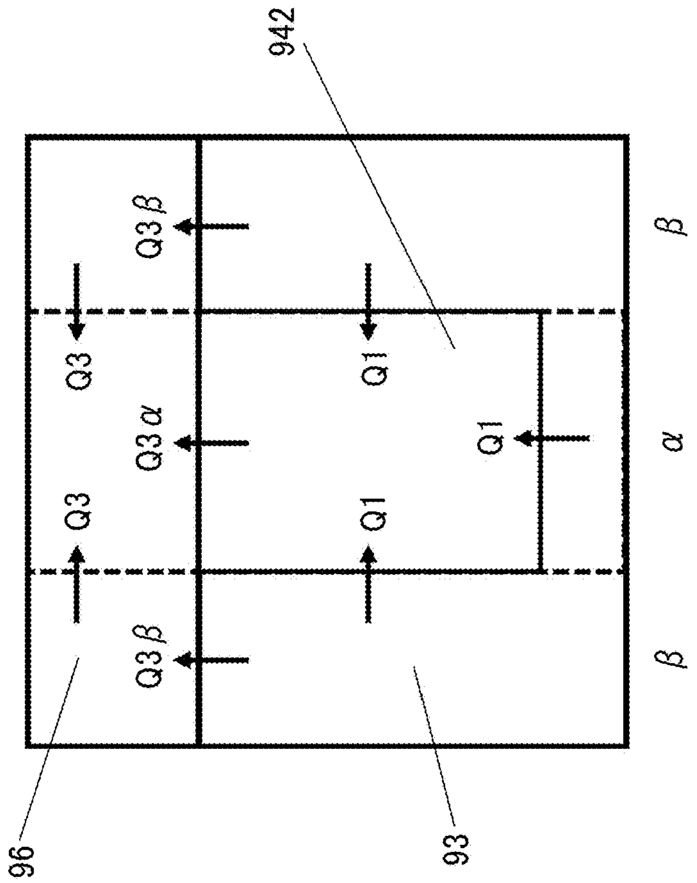
FIGS. 14A and 14B are diagrams illustrating heat transfer in a sliding pad of a comparative example.
Figure 14A:
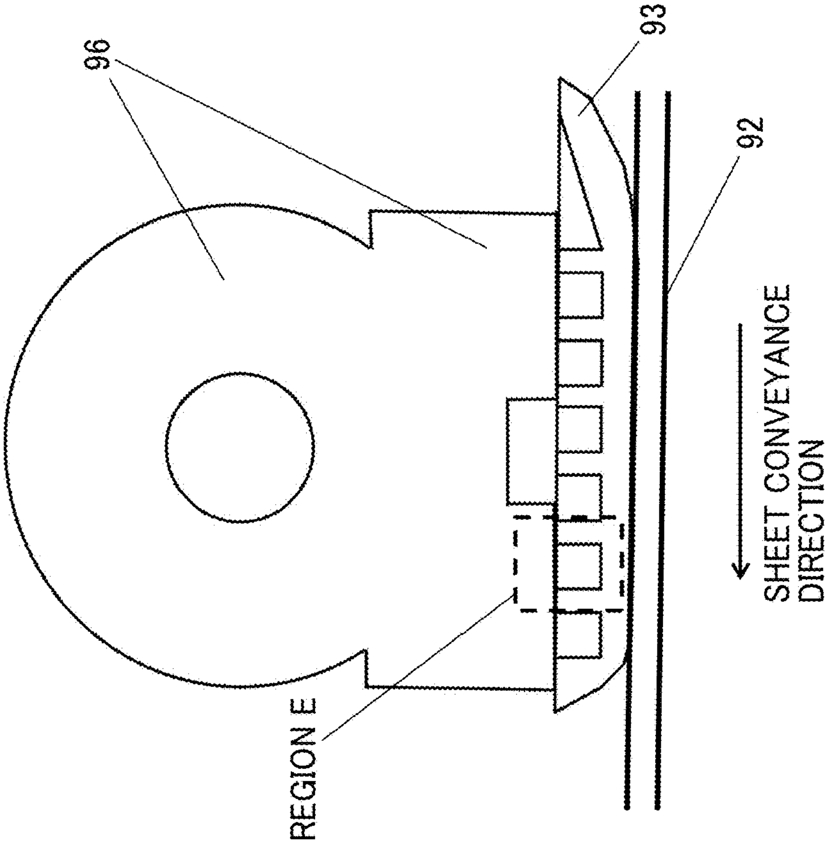

Comparison of Configuration of Embodiment with Configuration of Comparative Example Here, a difference in heat accumulation between the sliding pad according to an embodiment of the present disclosure and the sliding pad according to a comparative example will be described with reference to FIGS. 13A, 13B, 14A, and 14B. FIGS. 13A and 13B are diagrams illustrating movement of heat in the sliding pad according to the present embodiment, and FIGS. 14A and 14B are diagrams illustrating movement of heat in the sliding pad according to the comparative example. That is, the intermediate member 97 is provided in the sliding pad of FIGS. 13A and 13B, but the intermediate member 97 is not provided in the sliding pad of FIGS. 14A and 14B. The difference between the two sliding pads is in the provision of the intermediate member 97, and the other configurations are assumed to be the same.

Regarding FIGS. 13A and 13B, FIG. 13A is a cross-sectional view of the sliding pad 93 according to the present embodiment, and FIG. 13B is an enlarged view of a region D (broken-line region) in FIG. 13A. In FIG. 13B, the space of the pad recess is defined as an internal space 942. The region D is divided into a region α where the internal space is provided and a region β where the internal space is not provided. The amount of heat transferred from the sliding pad 93 to the internal space 942 is defined as Q1', the amount of heat transferred from the region β to the region α of the intermediate member 97 is defined as Q2', the amount of heat transferred from the internal space 942 to the intermediate member 97 is defined as Q2α', the amount of heat transferred from the sliding pad 93 to the intermediate member 97 defined as Q2β', the amount of heat transferred from the region β to the region α of the holder 96 is defined as Q3', the amount of heat transferred from the region α of the intermediate member 97 to the region α of the holder 96 is defined as Q3α', and the amount of heat transferred from the region β of the intermediate member 97 to the region β of the holder 96 is defined as Q3β'.

Regarding FIGS. 14A and 14B. FIG. 14A is a cross-sectional view of the configuration of the comparative example, and FIG. 14B is an enlarged view of a region E (broken-line region) in FIG. 14A. Referring to FIG. 14B, the space of the pad recess is defined as an internal space 942. The region E is divided into a region α where the internal space is provided and a region β where the internal space is not provided. The amount of heat transferred from the sliding pad 93 to the internal space 942 is defined as Q1, the amount of heat transferred from the internal space 942 to the region α of the holder 96 is defined as Q3α, the amount of heat transferred from the region β of the holder 96 to the region α is defined as Q3, and the amount of heat transferred from the region β of the sliding pad 93 to the region β of the holder 96 is defined as Q3β.

First, since there is no heat transfer in the same material, the amounts of heat Q2' and Q3' in FIG. 13B are 0, and the amount of heat Q3 in FIG. 14B is 0. That is. Q2'=Q3'=Q3=0. The amount of heat Q1' transferred from the sliding pad 93 to the internal space 942 in FIG. 13B and the amount of heat Q1 transferred from the sliding pad 93 to the internal space 942 in FIG. 14B are the same (Q1'=Q1). The amounts of heat Q3β' and Q3β of the heat moving in the region β are the same (Q3β'=Q3β).

Referring to FIGS. 13B and 14B, the relationship among the amounts of heat will be described taking the region α as an example. First, regarding the amount of heat Q3α in FIG. 14B, the amount of heat Q3α is larger than the amount of heat Q2α' in FIG. 13B because the holder 96 is made of metal and thus has a large thermal conductivity. That is, Q3α>Q2α'. Referring to FIG. 13B, the amount of heat Q3α' transferred from the intermediate member 97 to the holder 96 is smaller than the amount of heat Q2α', and thus, Q2α'>Q3α' is satisfied. That is, Q3α>Q3α'. In addition, since the amount of heat Q1'=Q1 as described above, it can be seen that Q1'−Q2α'>Q1−Q3α in terms of the amount of heat of the internal space 942 alone.

From this, it can be seen that the amount of heat stored in the internal space 942 is increased by providing the intermediate member 97, which has a small thermal conductivity and a thermal conductivity lower than those of the holder 96 and the sliding pad 93 members, between the holder 96 and the sliding pad 93. As the amount of heat stored in this space increases, the heat accumulation property of the sliding pad 93 also improves.

When the difference (Q1'−Q2α') between the amount of heat Q1' and Q2α' increases, the amount of heat accumulated in the internal space 942 also increases. Therefore, if it is desired to increase the amount of heat accumulated here, the material of the sliding pad 93, the size of the space, and the like may be designed on the basis of this.

<Improvement of Heat Accumulation Property of Sliding Pad>

Figure 15A:
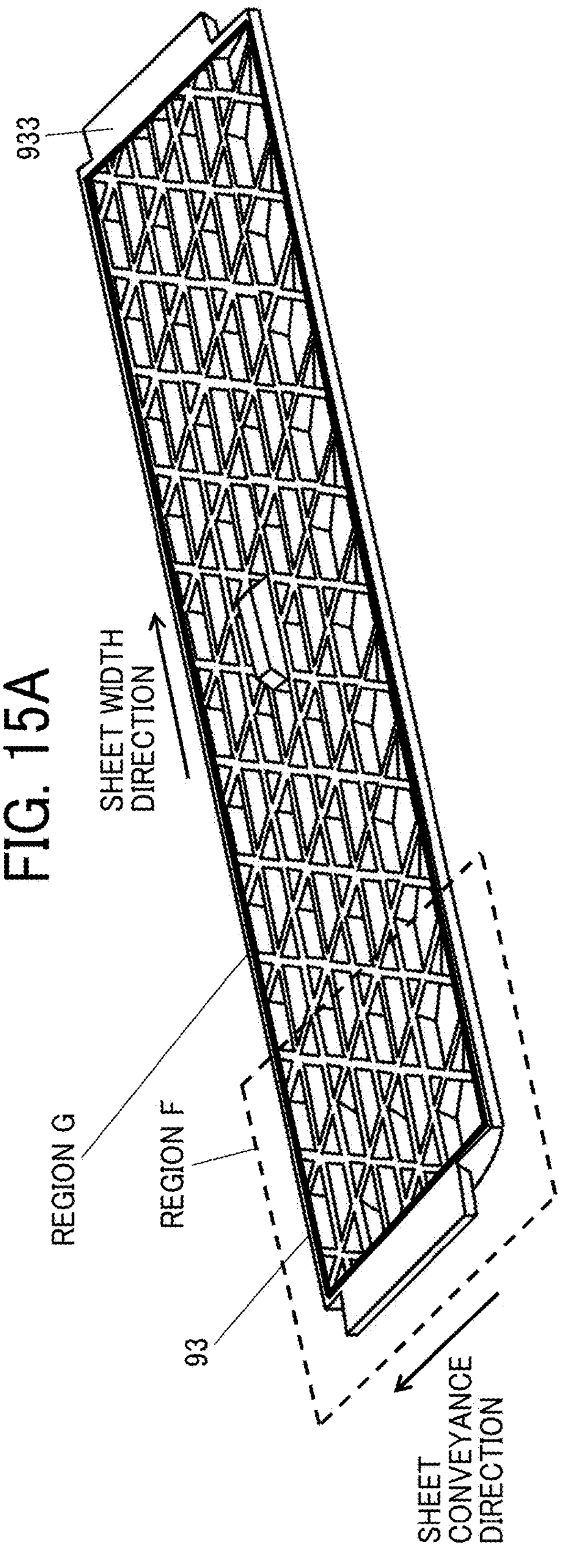
FIGS. 15A, 15B, and 15C are explanatory diagrams for improving the heat accumulation property of the sliding pad.
Figure 15B:
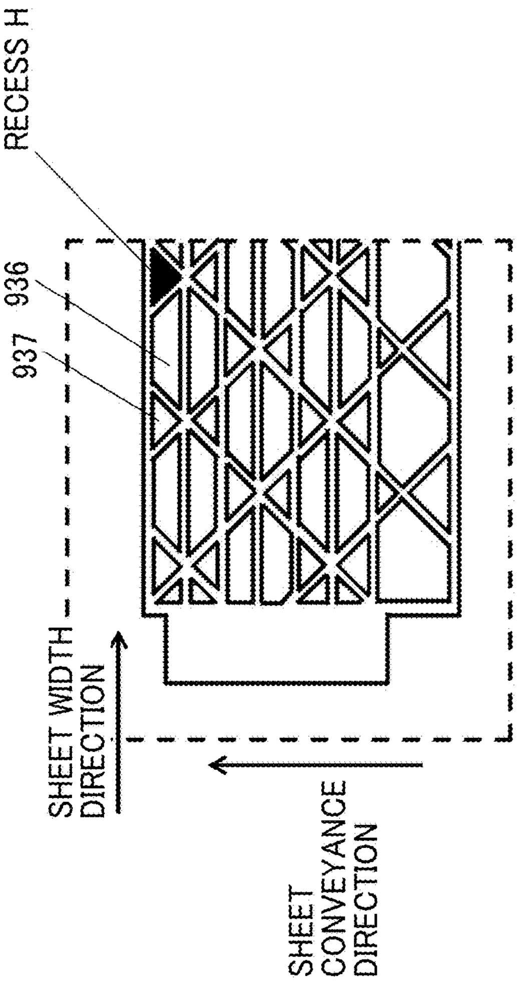
Figure 15C:
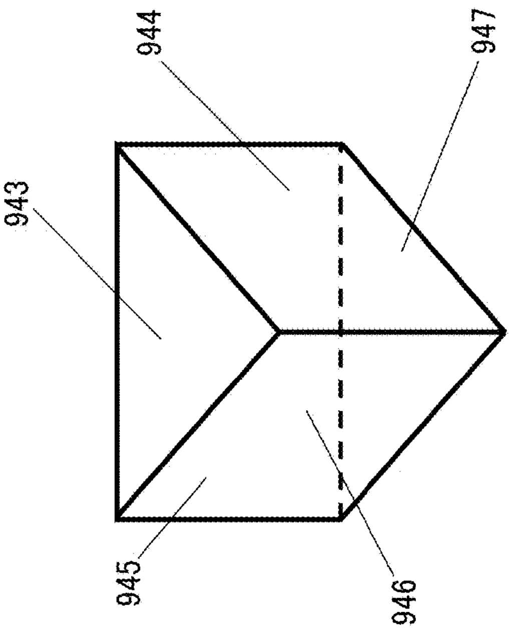

A configuration for improving the heat accumulation property of the sliding pad 93 will be described with reference to FIGS. 15A to 15C. FIG. 15A is a perspective view of the entire sliding pad 93 in the present embodiment, and FIG. 15B is a plan view of a region F (broken-line region) illustrated in FIG. 15A from the holder 96 side. FIG. 15C is a perspective view of a recess H (slid black portion in FIG. 15B) which is one of the plurality of pad recesses in FIG. 15B. Taking the recess H as an example, the relationship between the size of the space and the amount of heat in the pad recess will be described.

First, the recess H can be regarded as a space covered with the sliding pad 93 and the intermediate member 97. The space has the shape of a triangular prism as illustrated in FIG. 15C. The triangular prism can be said to be formed of five faces. An upper face 943 is a face on which the intermediate member 97 covers the sliding pad 93, side faces 944, 945, and 946 are faces formed by the ribs 939 forming pad recesses, and a lower face 947 corresponds to a bottom portion 941. The amount of heat accumulated in this space can be expressed as the sum of the areas of these five faces, that is, the surface area of the triangular prism. If the surface area is larger than the area of contact between the sliding pad 93 and the holder 96, it can be said that the amount of heat accumulated in the sliding pad 93 is large.

Therefore, in order to improve the heat accumulation property of the sliding pad 93, the total area (total surface area) of the space of all the recesses (a region G surrounded by a thick frame line in FIG. 15A) formed in the sliding pad 93 covered with the intermediate member 97 is made larger than the area of contact between the sliding pad 93 and the holder 96. This is because the configuration described above increases the amount of heat accumulated in the sliding pad 93 and improves the heat accumulation property. The relationship between the size of the space of the pad recess and the amount of heat has been described above by taking the recess H as an example. The same concept applies to the other pad recesses.

Modifications of Embodiment

In an embodiment of the present disclosure, a heater may be arranged in the sliding pad 93 or in a closed space formed by the sliding pad 93 and the intermediate member 97. A modification of the above-described embodiment will be described.

Figure 16:
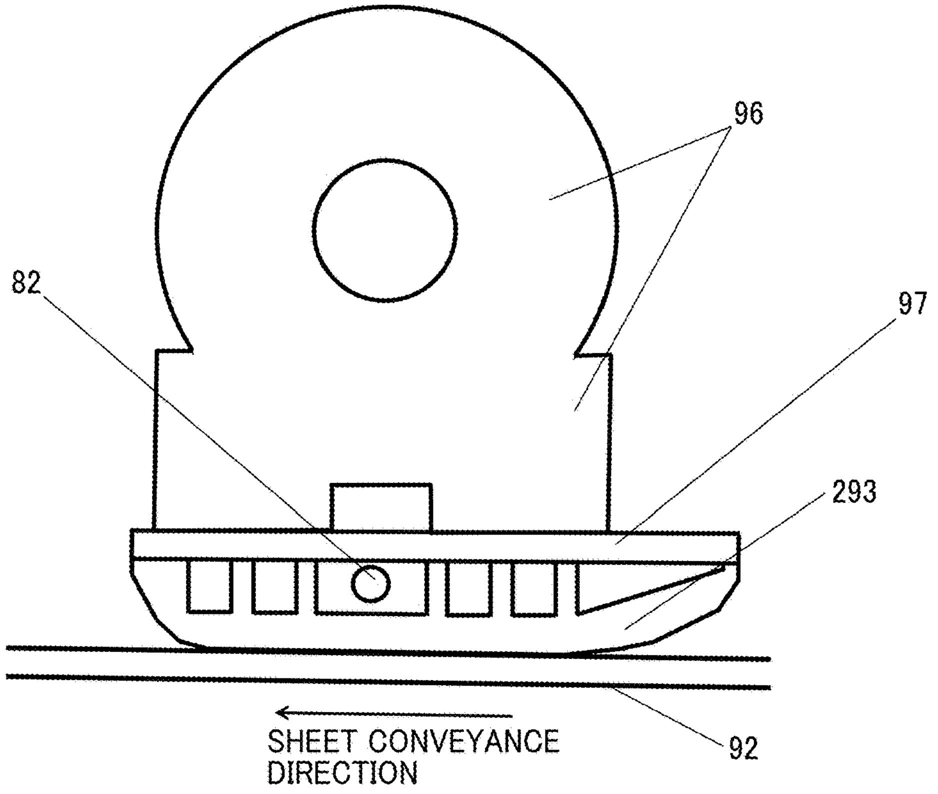
FIG. 16 is a diagram illustrating modification 1 of the embodiment of the present disclosure.

FIG. 16 is a diagram illustrating a configuration of Modification 1. In Modification 1, a sliding pad 293 has a configuration in which a space of one of a plurality of pad recesses is made large, and a heater lamp 82 which is a heater is provided in the space. The heater lamp 82 in the present embodiment is the same as the heater lamp 81 used in the heating roller 91, but is not limited thereto.

A control timing for turning on the heater lamp 82 will be described. For example, a temperature sensor such as a thermistor is provided on a fixing belt 92 to detect the temperature of the fixing belt 92. The heater lamp 82 is powered on/off so that the fixing belt 92 reaches a predetermined temperature. As a result, the heat accumulation property of the sliding pad 293 can be further improved, and the heating time can be shortened.

Since the sliding pad 293 is formed of a resin material such as plastic, it is necessary to prevent influence of heat of the heater lamp 82 on the sliding pad 93 such as deformation or the like. Therefore, it is desired to form the sliding pad 293 from a heat-resistant resin material or cover the periphery of the pad recess (space) in which heater lamp 82 is provided, with metal.

In the space in which the heater lamp 82 is provided, the amount of heat may exceed a desired amount of heat to be accumulated in the sliding pad 293, so that the sliding pad 293 may be deformed or the like. Therefore, it is necessary to release the accumulated heat to some extent. Thus, an end of the heater lamp 82 in the sheet width direction is opened to release the heat therefrom.

Figure 17:
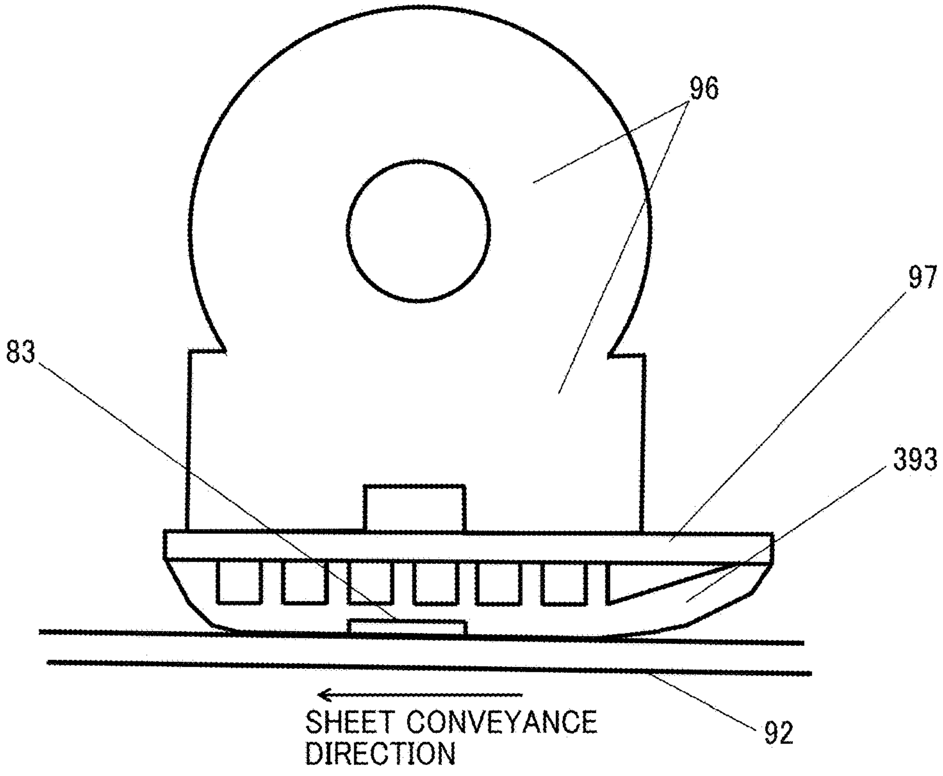
FIG. 17 is a diagram illustrating modification 2 of the embodiment of the present disclosure.

Another modification of the above-described embodiment will be described. FIG. 17 is a diagram illustrating a configuration of Modification 2. Modification 2 has a configuration in which a ceramic heater 83, which is a heater, is attached to the face of a sliding pad 393 on which the fixing nip portion is formed, instead of the heater lamp 82.

As in Modification 1, a temperature sensor such as a thermistor is provided on a fixing belt 92 to detect the temperature of the fixing belt 92. The ceramic heater 83 is powered on/off so that the fixing belt 92 reaches a predetermined temperature. As a result, the heat accumulation property of the sliding pad 393 can be further improved, and the heating time can be shortened.

The advantages of the above-described embodiment and modifications are examples. The present disclosure can provide, for example, specific advantages in the following aspects.

First Aspect

According to a first aspect, a fixing device includes: a rotatable endless belt (e.g., the fixing belt 92); a pressure rotator (e.g., the pressure roller 94) facing the endless belt to press the endless belt; a heating rotator (e.g., the heating roller 91) to heat the endless belt, and a pad (e.g., the sliding pad 93) disposed inside a loop of the endless belt and pressed by the pressure rotator via the endless belt to form a fixing nip portion between the endless belt and the pressure rotator. The fixing device further includes: an intermediate member (e.g., the intermediate member 97) having a pad abutment portion (e.g., the sliding pad abutment portion 971) to abut on the pad at a fixing nip facing portion (e.g., the fixing nip facing portion 933) that is a portion of the pad facing the fixing nip portion; and a holder (e.g., the holder 96) holding the pad and the intermediate member, the holder having an intermediate member abutment portion (e.g., the intermediate member abutment portion 961) to abut on a pad facing portion (e.g., the sliding pad facing portion 972) that is a portion of the intermediate member facing the pad abutment portion. The pad has a recess (e.g., the large pad recesses 936, the small pad recesses 937, and the upstream pad recesses 938) in the fixing nip facing portion, and the pad abutment portion abuts on the fixing nip facing portion and covers the recess in at least a part of the fixing nip portion corresponding to a passage region of a recording medium (e.g., the region 934 corresponding to a region through which a sheet passes in the fixing nip portion at the fixing nip facing portion).

According to the first aspect, in the pad, the heat accumulation property of the recesses in at least the part of the fixing nip portion corresponding to the passing region of the recording medium is improved. Therefore, it is possible to provide a fixing device that enhances the heat accumulation property of the pad, reduces a temperature drop during sheet passing, and prevents occurrence of an image failure such as a fixing failure.

Second Aspect

According to a second aspect, in the first aspect, the pad abutment portion and the pad facing portion are formed on a single plane.

According to the second aspect, the holder stably holds the pad, and sufficiently abuts on the pad.

Third Aspect

According to a third aspect, in the first aspect or the second aspect, the intermediate member is smaller in thermal conductivity than the holder.

According to the third aspect, the amount of heat accumulated in the pad increases, and the heat accumulation property can be improved.

Fourth Aspect

According to a fourth aspect, in any one of the first to third aspects, the intermediate member is lower in thermal conductivity than the pad.

According to the fourth aspect, it is possible to further improve the heat accumulation property of the pad and shorten the heating time.

Fifth Aspect

According to a fifth aspect, in any one of the first to fourth aspects, the intermediate member includes a positioning hole (e.g., the hole 974) that engages with a protruding positioning portion (e.g., the positioning portion 935) to position the holder on the pad.

According to the fifth aspect, the holder can stably hold the pad and the intermediate member.

Sixth Aspect

According to a sixth aspect, in any one of the first to fifth aspects, the pad includes a plurality of recesses having substantially the same widths in a direction orthogonal to a sheet conveyance direction.

According to the sixth aspect, the pressure from the pressure rotator can be uniformly dispersed.

Seventh Aspect

According to a seventh aspect, in any one of the first to sixth aspects, an area of a space formed by the recess and the intermediate member covering the recess is larger than an area of contact between the pad and the holder.

According to the seventh aspect, the amount of heat accumulated in the pad increases, and the heat accumulation property can be improved.

Eighth Aspect

According to an eighth aspect, in any one of the first to seventh aspects, a heater (e.g., the heater lamp 82) is disposed in the recess of the pad.

According to the eighth aspect, it is possible to further improve the heat accumulation property of the pad and shorten the heating time.

Ninth Aspect

According to a ninth aspect, in any one of the first to seventh aspects, a heater (e.g., the ceramic heater 83) is disposed at a position of the pad facing the fixing nip portion.

According to the ninth aspect, it is possible to further improve the heat accumulation property of the pad and shorten the heating time.

Tenth Aspect

A tenth aspect is an image forming apparatus including the fixing device according to any one of the first to ninth aspects.

According to the tenth aspect, in the pad, the heat accumulation property of the recesses in at least the portion corresponding to the passing region of the recording medium of the fixing nip portion is improved. Therefore, it is possible to provide an image forming apparatus that enhances the heat accumulation property of the pad, reduces a temperature drop during sheet passing, and prevents occurrence of an image failure such as a fixing failure.

The present disclosure is not limited to specific embodiments described above, and numerous additional modifications and variations are possible in light of the teachings within the technical scope of the appended claims. It is therefore to be understood that the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

Any one of the above-described operations may be performed in various other ways, for example, in an order different from the one described above.

The invention claimed is:

1. A fixing device comprising:

a rotatable endless belt;

a pressure rotator facing the endless belt to press the endless belt;

a heating rotator to heat the endless belt;

a pad disposed inside a loop of the endless belt and pressed by the pressure rotator via the endless belt to form a fixing nip portion between the endless belt and the pressure rotator;

an intermediate structure having a pad abutment portion to abut on the pad at a fixing nip facing portion that is a portion of the pad facing the fixing nip portion; and a holder holding the pad and the intermediate structure, the holder having an intermediate structure abutment portion to abut on a pad facing portion that is a portion of the intermediate structure facing the pad abutment portion, wherein:

the pad includes a plurality of recesses and a plurality of ribs in the fixing nip facing portion, the pad abutment portion abutting on the fixing nip facing portion and covering the recess in at least a part of the fixing nip portion corresponding to a passage region of a recording medium, and the plurality of recesses includes a plurality of first recesses and a plurality of second recesses smaller in size than the first recesses, the plurality of recesses being divided by the plurality of ribs, the plurality of first recesses and the plurality of second recesses being alternatively and regularly arranged entirely along a straight line in a width direction of a recording medium and entirely along another straight line in a conveyance direction of the recording medium.

2. The fixing device according to claim 1, wherein:

the plurality of first recesses are adjacent to the plurality of second recesses, respectively, in the width direction of the recording medium to form a plurality of sets of recesses, and one set of recesses is substantially the same in size as another set of recesses among the plurality of sets of recesses.

3. The fixing device according to claim 2, wherein the pad abutment portion and the pad facing portion are each on single planes which are parallel to each other.

4. The fixing device according to claim 2, wherein the intermediate structure is smaller in thermal conductivity than the holder.

5. The fixing device according to claim 2, wherein the intermediate structure is smaller in thermal conductivity than the pad.

6. The fixing device according to claim 2, wherein the intermediate structure includes a positioning hole that engages with a protruding positioning portion to position the holder on the pad.

7. The fixing device according to claim 2, wherein an area of a space formed by the recess and the intermediate structure covering the recess is larger than an area of contact between the pad and the holder.

8. The fixing device according to claim 2, further comprising a heater in the recesses of the pad.

9. The fixing device according to claim 2, further comprising a heater at a position of the pad facing the fixing nip portion.

10. An image forming apparatus, comprising the fixing device according to claim 2.

* * * * *